United States Patent [19]

Andrascheck et al.

[11] 4,113,679

[45] Sep. 12, 1978

[54] ANTISTATIC THERMOPLASTIC MOLDING COMPOSITIONS AND SHAPED ARTICLES MADE THEREFROM

[75] Inventors: Hans-Joachim Andrascheck; Rainer Mücke, both of Burgkirchen, Alz, Fed. Rep. of Germany

[73] Assignee: Hoechst Aktiengesellschaft, Frankfurt am Main, Fed. Rep. of Germany

[21] Appl. No.: 721,276

[22] Filed: Sep. 8, 1976

[30] Foreign Application Priority Data

Sep. 12, 1975 [DE] Fed. Rep. of Germany ....... 2540655

[51] Int. Cl.² ................................................ C08K 5/19
[52] U.S. Cl. ...................... 260/28.5 D; 260/DIG. 15; 260/DIG. 16; 526/4; 526/5
[58] Field of Search ................................. 526/4, 5, 6; 260/DIG. 15, DIG. 16, 28.5 D

[56] References Cited

U.S. PATENT DOCUMENTS

| | | | |
|---|---|---|---|
| 3,407,187 | 10/1968 | Savides | 526/5 |
| 3,445,440 | 5/1969 | Susi | 526/6 |
| 3,625,931 | 12/1971 | Ito | 526/5 |
| 3,639,518 | 2/1972 | Davies | 526/4 |
| 3,745,116 | 7/1973 | Brindell | 260/DIG. 16 |
| 3,903,198 | 9/1975 | Wei | 260/28.5 D |

OTHER PUBLICATIONS

Noller, "Chemistry of Organic Compounds", 2nd edition, W. B. Saunders Co., Philadelphia, 1957, p. 147.

*Primary Examiner*—Paul R. Michl
*Attorney, Agent, or Firm*—Connolly and Hutz

[57] ABSTRACT

The invention provides thermoplastic molding compositions and shaped articles made therefrom having improved antistatic properties, which comprise an antistatic agent a tricomponent mixture of a quaternary ammonium salt, a partial ester of a polyol and an organic acid, and an inorganic or organic compound containing an ammonium, alkali metal or alkaline earth metal ion. This antistatic agent is especially efficient and does not adversely affect the processability and the physical properties of the molding compositions.

1 Claim, No Drawings

ANTISTATIC THERMOPLASTIC MOLDING COMPOSITIONS AND SHAPED ARTICLES MADE THEREFROM

The present invention relates to thermoplastic molding compositions and shaped articles made therefrom having improved antistatic properties, and it relates furthermore to a process for the manufacture of antistatic thermoplastic molding compositions and corresponding shaped articles, wherein the antistatic agent used is particularly efficient and does not adversely affect the processability of the molding compositions and their physical properties.

As is known, thermoplastics such as vinyl chloride polymers, polyolefins, chlorinated polyethylenes, elastomers, for example acrylonitrile/butadiene/styrene (ABS), methylmethacrylate/butadiene/styrene (MBS) or methylmethacrylate/acrylonitrile/butadiene/styrene (MABS) polymers, are downright insulators because of their chemical composition, and therefore tend to heavy electrostatic charges. Besides the difficulties which occur due to this fact already in the manufacture of the corresponding shaped (molded) articles, the high electric surface resistance of such articles, for example sheets, cause further problems in their processing, for example because of poor travel in machines, or sparking. The accumulation of electrostatic chages on shaped articles for daily use is also disadvantageous since the articles are easily soiled because of the inherent high dust attraction.

In order to suppress undesirable effects of electrostatic charge, it is known that thermoplastic shaped articles are treated with surfactants or hygroscopic substances which are to divert these electrostatic charges. Although such external application of antistatics succeeds in rendering conductive the shaped articles for a short time, a long duration effect cannot be achieved because the agents applied only superficially are of course wiped off on handling and use of the corresponding articles.

Furthermore, it is known that antistatics are already intermixed with (incorporated into) the thermoplastic compositions from which shaped articles are manufactured, so that a more durable effect of the agent is attained. In the paper of S. Riethmayer in Gummi, Asbest, Kunststoffe 1973, 2, pp. 76–88; id. 4, pp. 298–308; id. 5, pp. 419–429 and id. 6, pp 506–512, there are described numerous antistatics for incorporation in thermoplastics, such as quaternary ammonium salts, fatty acid partial esters of polyols (see also German Offenlegungsschrift No. 1,927,677), polyethyleneglycol fatty acid esters, fatty alcohol polyglycol ethers and similar compounds. It results from this paper that one antistatic agent alone does not solve all problems arising with respect to antistatic treatment of thermoplastic compositions. Thus, for example, fatty acid partial esters of polyols are readily soluble in plastics, especially in polyvinyl chloride (PVC), and therefore cause neither any turbidity in transparent molding compositions nor a significant disturbance of the stabilization. However, their antistatic activity is very poor. As against that, quaternary ammonium salts have a better antistatic activity, but they have to be used in relatively large amounts, calculated on the plastic material, and this high proportion adversely affects the thermostability, for example of mixtures of vinyl chloride polymers. Moreover, it causes processing troubles, for examples in calendering, because of formation of deposits on the rolls or deterioration of the surface by smudging. Incorporated even in small amounts only, many of them still hinder the stabilization, and in all cases the antistatic effect obtained with these salts is insufficient for practical use.

Attempts have therefore been made to increase the antistatic activity of a compound in a synergistic manner by concomittantly using another antistatic substance. Thus, for example, it is known that the antistatic activity of fatty alcohol polyglycol ethers in polyolefins may be increased by polyethyleneglycol fatty acid esters (see the above paper, p. 426, right column, last paragraph).

It is an object of this invention to provide an antistatic mixture for thermoplastic materials which has an increased activity as compared to the individual known antistatics and simultaneously does not adversely affect in a significant manner the processing properties of the corresponding thermoplastic compositions and the utilitarian properties of the shaped articles made therefrom. A further special object is to increase the relatively good antistatic activity of quaternary ammonium salts in such a manner that a high antistatic effect is obtained with only very small amounts while simultaneously preventing troubles in the processing of the corresponding plastics compositions.

These objects are achieved by incorporating into the plastic material a tricomponent mixture of a quaternary ammonium salt, a partial ester of a polyol and an organic acid, and an inorganic or organic compound containing an ammonium, alkali metal or alkaline earth metal ion.

The present invention therefore provides antistatic thermoplastic molding compositions and shaped articles made therefrom which comprise as antistatic agent a mixture of the following three components:

A. a quaternary ammonium salt containing at least one alkyl radical having more than 8 carbon atoms and being linked to the nitrogen atom either directly or via functional groups,
B. a partial ester of a polyol and an organic acid, and
C. an inorganic or organic compound containing an ammonium, alkali metal or alkaline earth metal ion;

component A being present in an amount of from 0.4 to 1.5% by weight, component B in an amount of from 0.5 to 2.5% by weight, and component C in an amount of from 0.1 to 1.5% by weight, each relative to the total plastics mixture.

The present invention provides furthermore a process for the manufacture of antistatic thermoplastic molding compositions and the corresponding shaped articles, which comprises intermixing the three components A, B and C with the powdery thermoplastics.

It was surprising to observe that the antistatic agent in accordance with the invention not only gives a very high antistatic effect, but also has nearly no adverse influence on the thermostability of, for example, stabilized vinyl chloride polymer compositions. Moreover, it was particularly surprising to state that the partial esters having per se an insignificant or very low antistatic activity produce a considerable synergistic increase of the antistatic effect of quaternary ammonium salts in the case where an inorganic or organic compound containing an ammonium, alkali metal or alkaline earth metal ion is concomittantly used.

As quaternary ammonium salts there may be used in principle all those containing in the molecule at least one alkyl radical having more than 8 carbon atoms and being linked to the nitrogen atom either directly or via functional groups, for example compounds obtained by quaternization of corresponding amines or diamines such as primary, secondary or tertiary aliphatic or cycloaliphatic amines or diamines; of amides such as fatty acid amides or urea derivatives; of nitrogen containing heterocyclic compounds such as pyridine compounds or imidazolines. Quaternary ammonium salts of this kind and the preparation methods thereof are for example described in detail in the Riethmayer paper cited above (pp. 298 to 304).

Advantageously, quaternary ammonium salts having the following formula are used in accordance with this invention:

$$\left[ \begin{array}{c} R_2 \\ | \\ R_1-N-R_3 \\ | \\ R_4 \end{array} \right]^{\oplus} X^{\ominus}_a$$

wherein $R_1$ is a linear, preferably saturated or mono-unsaturated alkyl radical having more than 8 carbon atoms and advantageously less than 31 carbon atoms, preferably from 10 to 18 carbon atoms, from 1 to 6 carbon atoms and optionally being substituted by hydroxy groups, $R_2$ is hydrogen or an alkyl radical having from 1 to 18 carbon atoms, preferably from 1 to 6 carbon atoms, for example a methyl, ethyl, propyl or butyl radical or a benzyl radical, $R_3$ and $R_4$ each are a linear, saturated or mono-unsaturated alkyl radical having from 1 to 18 carbon atoms, a benzyl radical or a radical of the formula $-(CH_2CH_2O)_nH$ ($n$ being in the range of from 1 to 30); $R_3$ and $R_4$ may also form a ring having from 4 to 10, preferably from 4 to 6, carbon atoms, optionally being unsaturated, X is halogen, preferably chlorine or bromine, a perhalogenate anion, preferably $ClO_4$ or $BrO_4$, $NO_3$, $HSO_4$ or $CH_3SO_4$, $a$ is an integer of from 1 to 3, preferably 1 or 2, especially 1.

Quaternary ammonium salts being preferably used are listed in Table 1. Especially appropriate are compounds containing Nos. 8, 9, 10, 12 and 13.

Table 1 shows also the variety of suitable quaternary ammonium salts. The essential characteristic for the effect of such a salt resides in the fact that it contains an alkyl radical having more than 8 carbon atoms which is linked to the nitrogen atom either directly or via functional groups.

TABLE 1

| No. of compound | Preferred quaternary ammonium salts | | | | |
|---|---|---|---|---|---|
| | $R_1$ | $R_2$ | $R_3$ | $R_4$ | X |
| 1 | $-C_{12}H_{25}$ | $-CH_3$ | $-CH_3$ | $-CH_3$ | Cl |
| 2 | $-C_{12}H_{25}$ | $-CH_3$ | | $-CH_3$ | Cl |
| | | | $-CH_2-\phi$ | | |
| 3 | $-C_{12}H_{25}$ | $-CH_3$ | $-CH_3$ | $-CH_2CH_2OH$ | $HSO_4$ |
| 5 | $C_{12}H_{25}-\phi-CH_2-$ | $-CH_3$ | $-CH_3$ | $-CH_2CH_2OH$ | $ClO_4$ |
| 6 | $-C_{16}H_{33}$ | $-CH_3$ | $-CH_3$ | $-CH_3$ | Br |
| 7 | $-C_{18}H_{37}$ | $-CH_3$ | $-C_{18}H_{37}$ | $-CH_3$ | Cl |
| 8 | **Kokosalkyl | H | $-CH_2CH_2OH$ | $-CH_2CH_2OH$ | $ClO_4$ |
| 9 | $^{\Delta}$tallow alkyl$-\overset{CH_3}{\underset{CH_3}{\overset{|}{\underset{|}{N^{\oplus}}}}}-(CH_2)_3-$ | $-CH_3$ | $-CH_3$ | $-CH_3$ | 2 $CH_3SO_4$ |
| 10 | $C_{11}H_{23}\overset{O}{\overset{\|}{C}}-NHCH_2-CH_2-$ | $-CH_3$ | $-CH_3$ | $-CH_3$ | $CH_3SO_4$ |
| 11 | $C_{17}H_{35}\overset{O}{\overset{\|}{C}}-NH(CH_2)_3-$ | $-CH_3$ | $-CH_3$ | $-CH_2CH_2OH$ | $NO_3$ |
| 12 | $C_{12}H_{25}CCH_2CH(OH)CH_2-$ | $-CH_3$ | $-CH_2CH_2OH$ | $-CH_2CH_2OH$ | $CH_3SO_4$ |
| 13 | $C_{14}H_{29}O(CH_2)_3-$ | $-CH_3$ | $-CH_2CH_2OH$ | $-CH_2CH_2OH$ | $CH_3SO_4$ |
| 14 | $^{\Delta}$tallow alkyl$-OCH_2CH(OH)CH_2-$ | $-CH_3$ | $-CH_2CH_2OH$ | $-CH_2CH_2OH$ | $CH_3SO_4$ |

$^{\Delta}$tallow alkyl corresponds to the following typical chain distribution:
$C_{14}:C_{16}:C_{18}$ in a proportion of 5:25:65, 50% by weight of $C_{18}$ being oleyl
**coconut alkyl corresponds to the following typical chain distribution:
$C_8:C_{10}:C_{12}:C_{14}:C_{16}:C_{18}$ in a proportion of 7:6:51:19:8:9, 50 to 80% by weight of $C_{18}$ being oleyl
*4 $-C_{12}H_{25}$  $-CH_3$  $-CH_2CH_2OH$  $-CH_2CH_2OH$  $CH_3SO_4$ especially a decyl, undecyl, dodecyl, tridecyl, tetradecyl, pentadecyl, hexadecyl, heptadecyl, stearyl, oleyl, coconut-alkyl or tallow-alkyl radical and being linked to the nitrogen atom either directly or preferably via an amido-N-alkyl, O-alkyl, N-alkyl or benzyl group; alkyl standing for a radical having In accordance with this invention, the quaternary ammonium salts or mixtures thereof are used in amounts of from 0.4 to 1.5% by weight, preferably from 0.5 to 1% by weight, relative to the total plastics mixture.

According to this invention, those partial esters of a polyol and an organic acid are advantageously used which have at least one free hydroxy group and which are of liquid to pasty consistency because of their low esterification degree, since in this state they are easily and homogeneously incorporated into the plastics composition.

Suitable are for example partial esters of a polyol and a fatty acid or a fatty acid mixture having from 6 to 25 carbon atoms. Preferred are partial esters of a polyol having from 2 to 6 carbon atoms, especially ethyleneglycol, glycerol, diglycerol, erythritol, pentaerythritol, pentitol or hexitol, or an oxethylate or oxypropylate of these polyols and a fatty acid or fatty acid mixture having from 6 to 18 carbon atoms, preferably capronic, caprylic, capric, lauric, palmitic, stearic, oleic or ricinoleic acid or mixtures of these acids, preferably a capronic/capric acid mixture in a 1:1 ratio, a coconut or tallow fatty acid (composition of these two acids see Table 1). Particularly advantageous are monoglycerides, diglycerides or monosorbitols of the above individual fatty acids or fatty acid mixtures, especially glycerol monooleate, glycerol monoricinoleate, glycerol monococoate, glycerol monoester of a capronic/capric acid mixture in a 1:1 ratio, diglycerol monooleate or monococoate and sorbitane monolaurate.

The preparation of the partial esters is described for example in the cited Riethmayer paper or in the German Offenlegungsschrift No. 1,927,677 also mentioned above.

The partial esters or mixtures thereof to be used in accordance with this invention are employed in an amount of from 0.5 to 2.5% by weight, preferably from 1 to 1.5% by weight, relative to the total plastics mixture.

The third component of the antistatic mixture in accordance with this invention is an inorganic or organic compound having an ammonium, alkali metal or alkaline earth metal ion in the molecule. Of course, the use of compounds being known for causing a catalytic decomposition of the thermoplastic material or of its stabilizer must be avoided.

As component C, there are advantageously used ammonium, alkali metal or alkaline earth metal salts of inorganic or organic acids, for example salts of boric, perboric, carbonic, phosphoric, phosphorous, silicic acid or of fatty acids, optionally epoxidized, having from 6 to 25, preferably from 10 to 18, carbon atoms, furthermore alkali metal or alkaline earth metal hydroxides such as calcium or barium hydroxide, fatty alcoholates, phenolates or naphthenates of alkali or alkaline earth metals. Especially suitable are calcium carbonate (precipitated chalk), sodium carbonate (soda) and barium or calcium soaps such as barium or calcium salts of lauric palmitic, stearic, oleic or ricinoleic acid.

It is especially advantageous to use as component C those compounds which simultaneously are lubricants for the plastics material used. Thus, in the case where the plastic material is a vinyl chloride polymer, the above soaps, preferably calcium palmitate or stearate, or calcium montanate or OP wax (1,3-butanediol-montanic acid ester chalked, so that about 40% of the initially used montanic acid is present in the form of calcium salt), known as good lubricants are particularly appropriate.

According to this invention, the inorganic or organic compounds having an ammonium, alkali metal or alkaline earth metal ion, or mixtures thereof are used in an amount of from 0.1 to 1.5% by weight, preferably from 0.1 to 0.5% by weight, relative to the total plastics mixture. In the case where the compound employed is simultaneously a lubricant for the plastic material, it is advantageous to use an amount of about the indicated upper limit, while in all other cases an amount near the inferior limit is recommended.

The antistatic agent according to the present invention is suitable preferably for vinyl chloride homo- and copolymers or graft copolymers having a content of at least 50% by weight, preferably 75% by weight, and especially 85% by weight of polymerizable vinyl chloride, relative to the total polymer.

The following monomers are suitable, for example, for being copolymerized with vinyl chloride: olefins such as ethylene or propylene, vinyl esters of straight-chain or branched carboxylic acids having from 2 to 20, preferably from 2 to 4 carbon atoms, such as vinyl acetate, vinyl propionate, vinyl butyrate, vinyl-2-ethylhexoate, vinyl stearate; vinylic halides, such as vinyl fluoride, vinylidene fluoride, vinylidene chloride; vinyl ethers, unsaturated acids, such as maleic acid, fumaric acid, acrylic acid, methacrylic acid and their monoesters or diesters with monoalcohols or dialcohols having from 1 to 10 carbon atoms; acrylonitrile, styrene, and cyclohexyl maleimide.

For carrying out graft polymerization there may be used, for example, elastomeric polymerizates which have been obtained by polymerizing one or more of the following monomers: dienes, such as butadiene and cyclopentadiene; olefins, such as ethylene, propylene; styrene, unsaturated acids, such as acrylic acid or methacrylic acid, as well as their esters with monoalcohols or dialcohols having from 1 to 10 carbon atoms, acrylonitrile, vinyl compounds, such as vinyl esters of straightchained or branched carboxylic acids having from 2 to 20, preferably from 2 to 4 carbon atoms, vinyl halides, such as vinyl chloride and vinylidene chloride. Mixtures of the cited polymers may be employed.

The antistatic agent in accordance with this invention is particularly suitable for the above vinyl chloride polymers or mixtures thereof with each other or with other polymers, preferably with ABS, MBS, MABS polymers, chlorinated polyethylene or ethylene/vinyl acetate copolymers; the vinyl chloride polymer proportion being quantitatively preponderant.

The molding compositions of the invention, besides the tricomponent antistatic agent, contain advantageously processing auxiliaries and optionally other special additives such as heat and light stabilizers, lubricants, plasticizers, pigments or optical brighteners.

Suitable heat and light stabilizers are, for example, monoalkyl tin compounds and dialkyl tin compounds, the alkyl radicals having from 1 to 10 carbon atoms, the remaining valencies of the tin contained in these compounds being bound with further substituents by means of oxygen and/or sulfur atoms; aminocrotonic acid esters, urea and thiourea-derivatives, such as monophenyl urea and diphenyl thiourea, α-phenylindole. Organo-tin/sulfur stabilizers such as dimethyl-tin-bis(2-ethylhexyl-thioglycolate), di-n-butyl-tin-bis(2-ethylhexyl-thioglycolate), or di-n-octyl-tin-bis-(2-ethylhexyl-thioglycolate) are preferred.

The stabilizers are employed in quantities of from 0.2 to 3 weight %, calculated on the total mixture; the may be used as mixtures with each other and with antioxidants, such as alkyl-substituted hydroxyl compounds, for example ditertiary butyl paracresol, dibutylhydroxy-naphthalene, tertiary butylhydroxy anisole, and organo-phosphorus acid esters, e.g. tris-(mono- or di-)nonylphenyl phosphite. The light stability may be improved by adding to the mixtures UV-light absorbing substances, such as derivatives of benzophenone or benzotriazole, e.g. 2-(2'hydroxy-5'-methylphenyl)benzotriazole or 2-(2'-hydroxy-3'-tertiary butyl-5'-methylphenyl)-5-chloro-benzotriazole.

As lubricants there may be used, for example, one or more higher aliphatic carboxylic acids or hydroxycarboxylic acids, as well as their esters and amides, such as stearic acid, montanic acid, bis-stearyl- or bis-palmitoyl-ethylene diamine, montanic acid ester of ethanediol or 1,3-butanediol, fatty alcohols having more than 10 carbon atoms, and their ethers, low-molecular polyolefins, hard paraffins in amounts of from 0.1 to 1.5 weight %, calculated on the total mixture.

As plasticizers there may be employed for example one or more esters of aromatic or aliphatic dicarboxylic or tricarboxylic acids, of higher alkylsulfonic acids and of phosphoric acid, such as di-2-ethyl-hexyl-phthalate, di-2-ethylhexyladipate or -sebacate, alkylsulfonic acid ester of phenol or cresol, tricresyl-phosphate, epoxidized soja oils or castor oils. Preferred are, however, plasticizer-free mixtures.

In order to incorporate the antistatic agent in accordance with this invention, the processing agents and optionally special additives into the plastics powder, the components are thoroughly and homogeneously mixed. For this purpose, usual blending equipment may be employed, advantageously a high-speed mixer (fluid mixer). It is advantageous to carry out the honogenization in a heating/cooling mixer equipment usual in plastics processing, where the mixture is heated in the high-speed mixer to a temperature of about 140° C. by means of the agitation energy, thus ensuring a homogeneous intermixing of the individual components, and subsequently it is cooled in the cooling mixer.

Processing (molding) of the molding compositions of this invention is carried out according to known methods of thermoplastics manufacture, for example extrusion, calendering, injection molding, compression molding or blow molding of hollow articles.

The molding compositions of the invention are appropriate for the manufacture of all those shaped articles for which good and lasting antistatic properties are desired, preferably the manufacture of transparent sheets having an antistatic finish from plastics on the basis of vinyl chloride polymers by means of calendering or extrusion. In the case of calendering, the mixtures are pregelled at about 140° C. on a plastifying apparatus such as kneader or mixing roll, and subsequently processed to sheets on a two- or multiple-roll calender, advantageously on a four- or five-roll calender, at a temperature of the rolls of about 190° to about 210° C.

The following examples illustrate the invention. In all cases, a vinyl chloride suspension homopolymer (S-PVC) having a K value of 60 (according to German Industrial Standard DIN 53 726) and heat-stabilized by di-n-butyl-tin-bis-2-ethylhexylthioglycolate was used.

The mixing components of the individual examples which are listed in Table 2 are blended in a high-speed mixer. At first, the thermostability is determined in the roll test using a small portion of the above mixture. The remainder is pregelled at 140° C. on a kneader and calendered on a four-roll calender the rolls of which are heated at 190°, 195°, 200° and 210° C. (in travelling direction of the material) to form a sheet having a thickness of 150μm. The antistatic effect of the sheet is subsequently tested, that is, its surface resistance is measured in ohms ($R_{OA}$) according to German Industrial Standard DIN 53 482, using a digital Thera ohmmeter of Messrs. Kamphausen at a test voltage of 100 volts, its electrostatic charge in volts/cm according to German Industrial Standard DIN 53 486 and the half-value time in minutes or seconds also according to DIN 53 486. Instead of the friction device according to DIN 53 486 for applying an electric charge to the sheet test specimens, a point discharge device (Korona) having 9 kilovolts is used in order to apply the charge without contact.

Before measuring, the test specimens are stored for 24 hours in normal climate 24/50 (i.e., 23 ± 2° C. and 50 ± 5% of relative humidity) according to German Industrial Standard DIN 50 014.

The thermostability of the mixture is determined according to the roll test method as follows: about 300 g of the corresponding mixture are charged to a two-roll mill (dimensions of rolls: length about 40 cm, diameter about 15 cm) the rolls of which are heated at 180° C. and make about 18 and 20 rpm, and laminated to a sheet. The time (minutes) which passes until a distinct yellowing occurs is measured, the resulting minutes determine the thermostability of the corresponding mixture.

Besides the starting mixtures, also the test results are listed in Table 2, that is, the thermostability of the mixture in minutes, the surface resistance ($R_{OA}$) in ohms, the charge in volts/cm and the half-value time in minutes or seconds, the latter three of the sheets manufactured from the mixtures.

The quaternary ammonium salt used in the corresponding starting mixture is one of the compounds listed in Table 1; the "mixing components" column of Table 2 contains therefore the numbers of the corresponding salts according to Table 1. Furthermore, the known abbreviations "wax OP" (for 1,3-butanediolmontanic acid ester chalked, so that about 40% of the initially used montanic acid are present in the form of calcium salt), "wax E" (for 1,3-butanediolmontanic acid ester) and "wax C" (for bisstearylethylene diamine) are used.

The amounts of the mixing components are indicated in % by weight.

TABLE 2

Survey of Examples

| Example No. | | Mixing components | $R_{OA}$ ohms | Charge volts/cm | Half-value time min. (') or sec. (") | Thermo-stability min. (') |
|---|---|---|---|---|---|---|
| Comparative Examples | | | | | | |
| 1 | 88.1 | S-PVC | | | | |
| | 10.0 | MABS | | | | |
| | 1.5 | butyl-tin | $10^{14}$ | 4100 | more than 30' | 40' |
| | 0.4 | wax OP | | | | |
| 2 | 87.1 | S-PVC | | | | |
| | 10.0 | MABS | | | | |
| | 1.5 | butyl-tin | $10^{12}$ | 3600 | more than 30' | 40' |
| | 0.4 | wax OP | | | | |
| | 1.0 | glycerol monooleate | | | | |

TABLE 2-continued

Survey of Examples

| Example No. | | Mixing components | $R_{OA}$ ohms | Charge volts/cm | Half-value time min. (') or sec. (") | Thermo-stability min. (') |
|---|---|---|---|---|---|---|
| 3 | 87.6 | S-PVC | | | | |
| | 10.0 | MABS | | | | |
| | 1.5 | butyl-tin | | | | |
| | 0.4 | wax E | $10^{13}$ | 3800 | more than 30' | 40' |
| | 0.5 | No. 12 | | | | |
| 4 | 87.6 | S-PVC | | | | |
| | 10.0 | MABS | | | | |
| | 1.5 | butyl-tin | | | | |
| | 0.4 | wax OP | $10^{10}$ | 3500 | 3,1' | 30' |
| | 0.5 | No. 12 | | | | |
| Examples in accordance with the invention | | | | | | |
| 5 | 86.6 | S-PVC | | | | |
| | 10.0 | MABS | | | | |
| | 1.5 | butyl-tin | | | | |
| | 0.2 | wax E | $10^9$ | 2600 | 25" | 30' |
| | 0.5 | No. 12 | | | | |
| | 1.0 | glycerol monooleate | | | | |
| | 0.2 | Ca-stearate | | | | |
| 6 | 96.6 | S-PVC | | | | |
| | 1.5 | butyl-tin | | | | |
| | 0.5 | No. 12 | $10^9$ | 3000 | 30" | 35' |
| | 1.0 | glycerol monooleate | | | | |
| | 0.4 | Ca-stearate | | | | |
| 7 | 96.6 | S-PVC | | | | |
| | 1.5 | butyl-tin | | | | |
| | 0.5 | No. 12 | $10^9$ | 2200 | 25" | 35' |
| | 1.0 | glycerol monooleate | | | | |
| | 0.4 | wax OP | | | | |
| 8 | 96.2 | S-PVC | | | | |
| | 1.5 | butyl-tin | | | | |
| | 0.4 | wax E | | | | |
| | 0.5 | No. 12 | $10^9$ | 3000 | 30" | 35' |
| | 1.0 | glycerol monooleate | | | | |
| | 0.4 | $CaCO_3$ (chalk) | | | | |
| 9 | 96.2 | S-PVC | | | | |
| | 1.5 | butyl-tin | | | | |
| | 0.4 | wax C | | | | |
| | 0.5 | No. 12 | $10^8$ | 3000 | 10" | 25' |
| | 1.0 | glycerol monooleate | | | | |
| | 0.4 | $CaCO_3$ (chalk) | | | | |
| 10 | 86.1 | S-PVC | | | | |
| | 10.0 | MABS | | | | |
| | 1.5 | butyl-tin | | | | |
| | 0.4 | wax E | | | | |
| | 0.5 | No. 12 | $10^8$ | 1250 | 5" | 35' |
| | 1.0 | glcerol monooleate | | | | |
| | 0.4 | $NaCO_3$ (soda) | | | | |
| 11 | 84.6 | S-PVC | | | | |
| | 10.0 | MABS | | | | |
| | 1.5 | butyl-tin | | | | |
| | 0.5 | No. 12 | | | | |
| | 1.0 | glyerol monoricinoleate | $10^9$ | 2700 | 40" | 40' |
| | 0.4 | wax OP | | | | |
| 12 | 86.6 | S-PVC | | | | |
| | 10.0 | MABS | | | | |
| | 1.5 | butyl-tin | | | | |
| | 0.5 | No. 12 | $10^9$ | 2600 | 25" | 35' |
| | 1.0 | diglycerol monooleate | | | | |
| | 0.4 | wax OP | | | | |
| 13 | 86.6 | S-PVC | | | | |
| | 10.0 | MABS | | | | |
| | 1.5 | butyl-tin | | | | |
| | 0.5 | No. 12 | $10^9$ | 2400 | 25" | 35' |
| | 1.0 | glycerol monococoate | | | | |
| | 0.4 | wax OP | | | | |
| 14 | 86.3 | S-PVC | | | | |
| | 10.0 | MABS | | | | |
| | 1.5 | butyl-tin | | | | |
| | 0.8 | No. 9 | $10^8$ | 2800 | 30" | 30' |
| | 1.0 | glycerol monooleate | | | | |
| | 0.4 | wax OP | | | | |
| 15 | 86.5 | S-PVC | | | | |
| | 10.0 | MABS | | | | |
| | 1.5 | butyl-tin | | | | |
| | 0.6 | No. 9 | $10^8$ | 3400 | 15" | 35' |
| | 1.0 | glycerol monoester of capronic/capric acid (1:1) | | | | |
| | 0.4 | wax OP | | | | |
| 16 | 86.5 | S-PVC | | | | |
| | 10.0 | MABS | | | | |
| | 1.5 | butyl-tin | | | | |
| | 0.6 | No. 10 | $10^8$ | 1800 | 10" | 25' |
| | 1.0 | glycerol monooleate | | | | |
| | 0.4 | wax OP | | | | |
| 17 | 86.1 | S-PVC | | | | |

TABLE 2-continued
Survey of Examples

| Example No. | Mixing components | | $R_{OA}$ ohms | Charge volts/cm | Half-value time min. (') or sec. (") | Thermo-stability min. (') |
|---|---|---|---|---|---|---|
|  | 10.0 | MABS |  |  |  |  |
|  | 1.5 | butyl-tin |  |  |  |  |
|  | 0.4 | wax E |  |  |  |  |
|  | 0.6 | No. 8 | $10^9$ | 3000 | 30"40' |  |
|  | 1.0 | glycerol monooleate |  |  |  |  |
|  | 0.4 | NaCO₃ (soda) |  |  |  |  |
| 18 | 86.5 | S-PVC |  |  |  |  |
|  | 10.0 | MABS |  |  |  |  |
|  | 1.5 | butyl-tin |  |  |  |  |
|  | 0.6 | No. 9 | $10^8$ | 3400 | 15" | 30' |
|  | 1.0 | glycerol monoester of capronic/capric acid (1:1) |  |  |  |  |
|  | 0.4 | wax OP |  |  |  |  |
| 19 | 86.6 | S-PVC |  |  |  |  |
|  | 10.0 | chlorinated polyethylene (Cl content 39%) |  |  |  |  |
|  | 1.5 | butyl-tin |  |  |  |  |
|  | 0.5 | No. 12 | $10^9$ | 1600 | 15" | 35' |
|  | 1.0 | glycerol monooleate |  |  |  |  |
|  | 0.4 | wax OP |  |  |  |  |
| 20 | 86.6 | S-PVC |  |  |  |  |
|  | 10.0 | MABS |  |  |  |  |
|  | 1.5 | butyl-tin |  |  |  |  |
|  | 0.5 | No. 13 | $10^9$ | 2000 | 10" | 35' |
|  | 1.0 | glycerol monoester of capronic/capric acid (1:1) |  |  |  |  |
|  | 0.4 | wax OP |  |  |  |  |

Further explanations as to the preceding Examples are given as follows:

Comparative Example 1 is a usual formulation on the basis of a vinyl chloride polymer, which contains wax OP (component C) as lubricant.

The molding composition or sheet of Comparative Example 2 contains glycerol monooleate (component B) besides wax OP (component C).

In Comparative Example 3, a quaternary ammonium salt (component A) is present, wax E serving as lubricant.

Besides wax OP (component C), the molding composition or sheet of Comparative Example 4 contains also a quaternary ammonium salt (component A).

Examples 5 through 20 are molding compositions or shaped articles according to this invention. As results from Table 2, they have a particularly high antistatic effect, and above all, they are distinguished by the fact that this antistatic effect is obtained with the use of extremely small quantities, resulting in the following further advantages:

The thermostability of the molding compositions is maintained, especially in view of ensuring a trouble-free processing on an industrial scale.

No problems arise during the different processing steps such as mixing, calendering or extrusion, above all there is no formation of deposits on machine parts (nozzles, rolls), no smudging and thus no surface deterioration of the manufactured shaped articles.

Furthermore, the properties inherent in the molding compositions and shaped articles, for example transparency, strength, tenacity, hardness, heat resistance, are maintained.

A substantial advantage of the sheets having an antistatic finish in accordance with this invention resides in the fact that this antistatic finish does not adversely affect further processing of the sheets, for example deep-drawing to articles of daily use, compression molding to audiovisual information carriers, or the application of such sheets in the packaging field. Especially, there is no settling of deposits or residues in the corresponding processing machines (deep-drawing equipment, presses), and the finished articles obtained do not show any surface deterioration, caused for example by exudation.

We claim:

1. Antistatic thermoplastic molding composition wherein the thermoplastic material is selected from the group consisting of vinyl chloride homo-, co- and graft-copolymers having a content of at least 50% by weight of polymerizable vinyl chloride and wherein the antistatic agent is a mixture of the following three components:

A. a quaternary ammonium salt of the formula

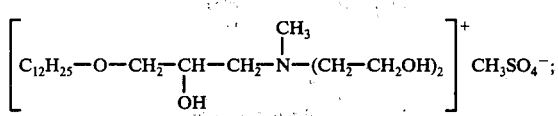

B. glycerol monooleate in an amount of 70% by weight and glycerol dioleate in an amount of 30% by weight; and C. wax OP;

component A being present in an amount of from 0.4 to 1.5% by weight, component B in an amount of from 0.5 to 2.5% by weight, and component C in an amount of from 0.5 to 1.5% by weight, each relative to the total composition.

* * * * *